(12) United States Patent
Kinemura et al.

(10) Patent No.: US 7,583,317 B2
(45) Date of Patent: Sep. 1, 2009

(54) FOLDABLE ELECTRONIC IMAGE PICKUP APPARATUS

(75) Inventors: Hiroyuki Kinemura, Nishinomiya (JP); Motohiro Sasada, Kobe (JP); Shigeru Miki, Yao (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 584 days.

(21) Appl. No.: 10/790,210

(22) Filed: Mar. 2, 2004

(65) Prior Publication Data

US 2004/0174452 A1 Sep. 9, 2004

(30) Foreign Application Priority Data

Mar. 4, 2003 (JP) .............................. 2003-056536
Mar. 4, 2003 (JP) .............................. 2003-056555

(51) Int. Cl.
*H04N 5/225* (2006.01)
*H04M 1/00* (2006.01)
(52) U.S. Cl. ..................................... 348/376; 455/575.1
(58) Field of Classification Search ......... 348/373–376; 455/575.1, 575.3, 575.4
See application file for complete search history.

(56) References Cited

U.S. PATENT DOCUMENTS

| | | | | |
|---|---|---|---|---|
| 5,043,822 | A | * | 8/1991 | Ichiyoshi et al. ............. 348/376 |
| 5,719,799 | A | * | 2/1998 | Isashi .......................... 708/105 |
| 5,973,915 | A | * | 10/1999 | Evans .......................... 361/681 |
| 6,850,784 | B2 | * | 2/2005 | SanGiovanni ............. 455/575.1 |
| D502,932 | S | * | 3/2005 | Minamide .................. D14/138 |
| 7,146,197 | B2 | * | 12/2006 | Kang et al. ............... 455/575.1 |
| 7,359,003 | B1 | * | 4/2008 | Knighton et al. ............. 348/376 |
| 2001/0004269 | A1 | * | 6/2001 | Shibata et al. ......... 348/333.06 |

FOREIGN PATENT DOCUMENTS

| | | |
|---|---|---|
| JP | 06-252824 | 9/1994 |
| JP | 07-288860 | 10/1995 |
| JP | 11-187291 | 7/1999 |

(Continued)

OTHER PUBLICATIONS

Unexamined Japanese Patent Publication 2001-169166 (Jun. 22, 2001) * English Abstract.

(Continued)

*Primary Examiner*—Timothy J Henn
(74) *Attorney, Agent, or Firm*—Kratz, Quintos & Hanson, LLP

(57) ABSTRACT

A display cabinet having a monitor is attached to a main cabinet serving as a handle portion so as to be overlapped with the main cabinet. The main cabinet and the display cabinet are pivotal within a plane generally perpendicular to the optical axis of a lens with one end of the main cabinet being connected to one end of the display cabinet. A soft lock device is provided between the main cabinet and the display cabinet for holding the display cabinet at a pivot position with respect to the main cabinet. The display cabinet has a pivot center axis which is aligned with the optical axis of the lens, and an image pickup device is located behind the lens. An operation button is provided on the main cabinet within the reach of a finger of a hand holding the main cabinet.

5 Claims, 7 Drawing Sheets

FOREIGN PATENT DOCUMENTS

| | | |
|---|---|---|
| JP | 2001-186396 | 7/2001 |
| JP | 2002-158758 | 5/2002 |
| JP | 2002135380 A * | 5/2002 |
| JP | 2002-290523 | 10/2002 |
| WO | WO 01/84269 | 11/2001 |
| WO | WO 02/100076 | 12/2002 |

OTHER PUBLICATIONS

Unexamined Japanese Patent Publication 2001-218087 (Aug. 10, 2001) * English Abstract.

Unexamined Japanese Patent Publication HEI.11-88758 (Mar. 30, 1999) * English Abstract.

* cited by examiner

FOLDABLE ELECTRONIC IMAGE PICKUP APPARATUS

FIELD OF THE INVENTION

The present invention relates to an electronic image pickup apparatus such as a mobile phone with a camera, the image pickup apparatus being adapted to be unfolded for taking a picture and folded for storage.

BACKGROUND OF THE INVENTION

There is a demand for further size reduction of an electronic image pickup apparatus (hereinafter referred to simply as "image pickup apparatus") employing an image pickup device. The image pickup apparatus having a smaller size is more conveniently carried and stored, but it is difficult to stably hold the image pickup apparatus. Further, it is impossible to increase the size of a monitor of the image pickup apparatus, so that a user feels inconvenience when taking a picture.

FIG. 11 is a perspective view illustrating an exemplary image pickup apparatus free from the aforesaid problem (see Japanese Unexamined Patent Publication No. HEI11-187291 (1999)) as seen from the side of a subject. The image pickup apparatus 8 includes a main cabinet 91 and an image pickup cabinet 92 having substantially the same shape and connected to each other via a hinge 97. The main cabinet 91 includes a monitor 93 and a shutter button 94, and the image pickup cabinet 92 includes a lens 95 and an image pickup device 96.

When a picture is to be taken, the image pickup cabinet 92 is opened to be juxtaposed with the main cabinet 91, whereby the image pickup apparatus can be unfolded to have a convenient size. A right-handed photographer holds the main cabinet 91 by a right hand. When the image pickup apparatus is to be stored, the image pickup cabinet 92 is pivoted about the hinge 97 in an arrow direction A thereby to be overlapped with the main cabinet 91.

By pivoting the image pickup cabinet 92 in an arrow direction B in an open state, the angle of the monitor 93 with respect to the optical axis of the lens 95 can be changed.

In general, the smaller-size image pickup apparatus can be held by a single hand, and an operation button can be operated by the hand holding the apparatus. In view of the fact that most people are right-handed, the image pickup apparatus is constructed so that the operation button can easily be operated by a right hand.

However, the image pickup apparatus shown in FIG. 11 is inconvenient for a left-handed photographer. When the main cabinet 91 is held in an orientation shown in FIG. 11 by a left hand, the monitor 93 is oriented in an opposite direction from the subject. Therefore, the photographer cannot view the monitor 93. If the main cabinet 91 is turned over and the photographer holds the main cabinet 91 by a left hand with the monitor 93 facing toward the photographer, the shutter button 94 faces downward. Therefore, it is difficult to operate the shutter button 94.

SUMMARY OF THE INVENTION

It is an object of the present invention to provide an image pickup apparatus which has a folding and unfolding function and is easy to operate whether a photographer is right-handed or left-handed.

According to the present invention, there is provided an image pickup apparatus 8, which comprises a main cabinet 1 and a display cabinet 5 pivotal with respect to each other within a plane generally perpendicular to the optical axis of a lens 2 with one end of the main cabinet 1 being connected to one end of the display cabinet 5.

A lock device 9 is provided between the cabinets 5 and 1 for holding the display cabinet 5 at a pivot position with respect to the main cabinet 1. The display cabinet 5 includes a proximal portion 51 having a pivot center axis, and a free end portion 52 pivotal about a pivotal support shaft 53 perpendicular to the pivot center axis with respect to the proximal portion. A monitor 6 is provided on the free end portion 52.

An image pickup device 3 provided behind the lens 2 is integral with the display cabinet 5, and is pivotally supported by the main cabinet 1. The image pickup device 3 has a light receiving surface longitudinally aligned with the monitor 6.

The inventive image pickup device provides the following effects.

1. When a picture is to be taken, the display cabinet 5 is pivoted within the plane generally perpendicular to the optical axis of the lens.

Where a photographer is right-handed, the display cabinet 5 is pivoted leftward with respect to the main cabinet 1. Then, the display cabinet 5 is fixed at a leftward pivoted position with respect to the main cabinet 1 by the lock device 9. In this state, the main cabinet 1 is held by a right hand.

Where the photographer is left-handed, the display cabinet 5 is pivoted rightward, and the main cabinet 1 is held by a left hand.

The hand is laterally moved toward the main cabinet 1 for holding the main cabinet 1, and the display cabinet 5 extends from the main cabinet 1 in a direction laterally opposite from the lateral movement of the hand. More specifically, where the main cabinet 1 is to be held by fingers or palm of the right hand with the display cabinet 5 pivoted leftward, the right hand is moved leftward from the right side of the main cabinet 1 to hold the main cabinet 1. At this time, the display cabinet 5 is fixed in a leftward pivoted state and, hence, does not hinder the movement of the right hand.

Where the main cabinet 1 is to be held by the left hand, the display cabinet 5 is fixed in a rightward pivoted state and, hence, does not hinder the movement of the left hand. Therefore, the main cabinet 1 can naturally and easily be held.

2. If the free end portion 52 of the display cabinet 5 is pivoted about the pivotal support shaft 53 with the display cabinet 5 pivoted with respect to the main cabinet 1, the monitor 6 faces toward the photographer.

Whether the image pickup apparatus 8 is held by the right hand or by the left hand, the monitor 6 is located away from the hand which holds the image pickup device 8. When the photographer stretches his arm forward with the image pickup apparatus held by the hand, the monitor faces toward the photographer. Therefore, the photographer can easily take a picture.

3. The image pickup device 3 is provided in the display cabinet 5 and pivotal unitarily with the display cabinet 5. With the monitor 6 on the display cabinet 5 being longitudinally aligned with the light receiving surface 31 of the image pickup device 3, an erect image can be displayed on the entire screen of the monitor 6 whether the monitor 6 is oriented vertically or horizontally.

DESCRIPTION OF THE PREFERRED EMBODIMENTS

First Embodiment

Overall Construction

Figure 1:
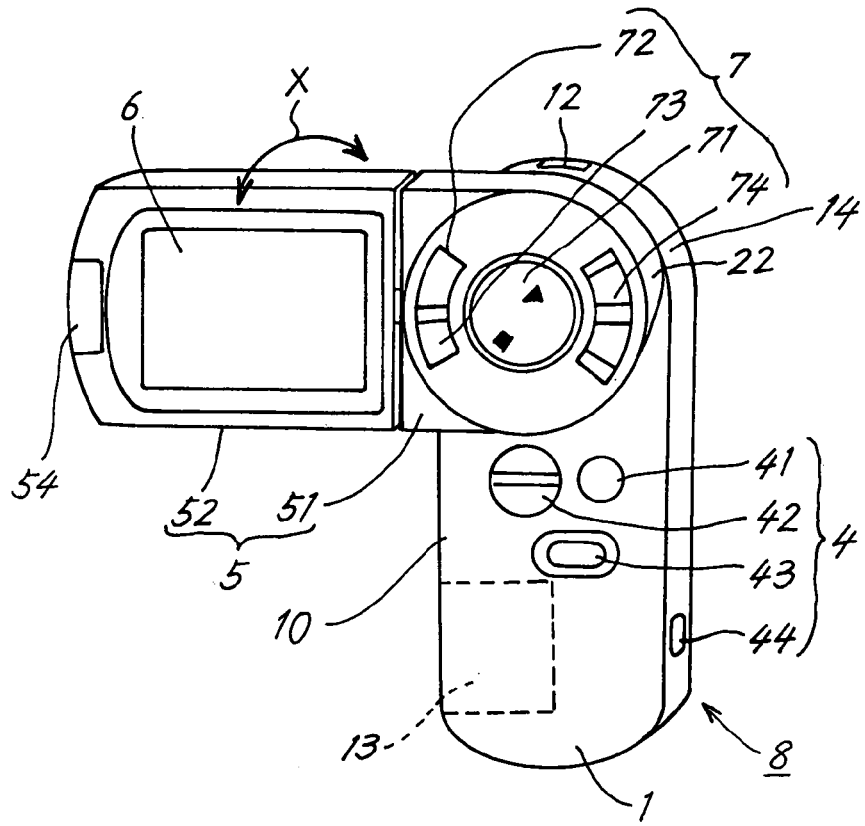
FIG. 1 is a perspective view illustrating an image pickup apparatus with a display cabinet thereof being opened at 90 degrees with respect to a main cabinet as seen from the side of a photographer.
Figure 2:
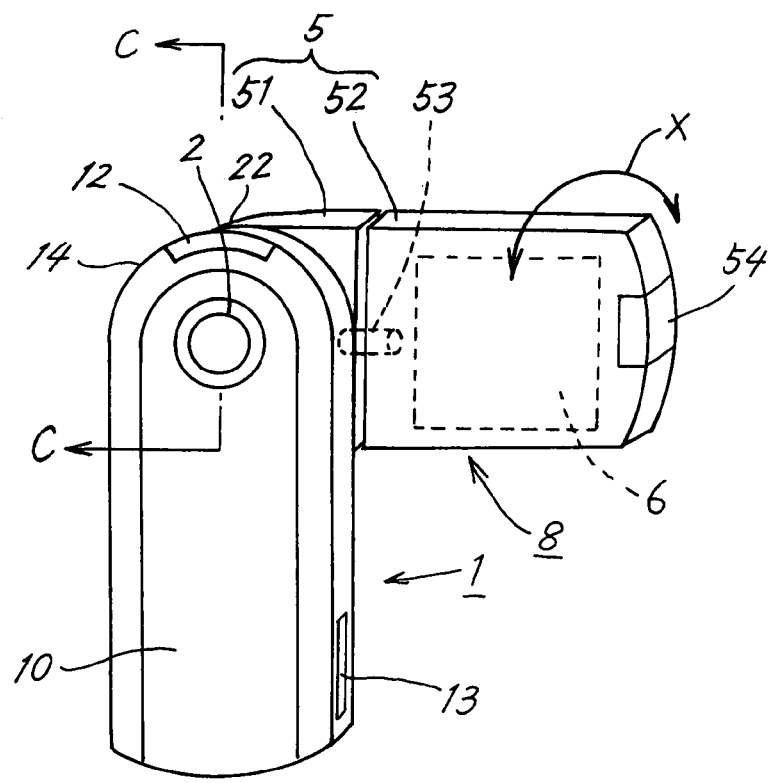
FIG. 2 is a perspective view illustrating the image pickup apparatus of FIG. 1 as seen from the side of a subject.
Figure 3:
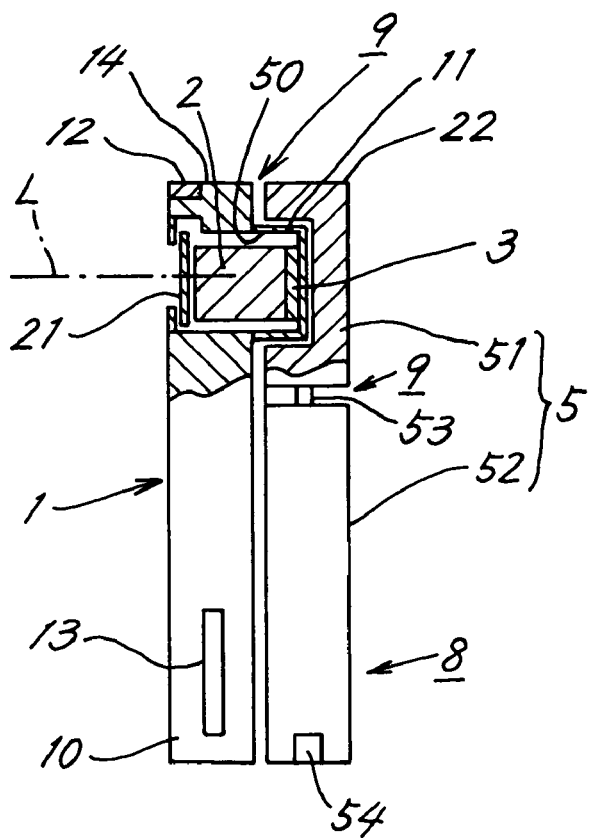
FIG. 3 is a partly sectional side view illustrating the display cabinet in a closed state as seen from the right side in FIG. 2.

An image pickup apparatus 8 is capable of picking up a still image and a video image, and includes a main cabinet 1 and a display cabinet 5 having a monitor 6, wherein one end of the display cabinet 5 is pivotally connected to one end of the main cabinet 1. FIG. 1 is a perspective view illustrating the image pickup apparatus with the display cabinet 5 being opened at 90 degrees with respect to the main cabinet 1 as seen from the side of a photographer when a video image is picked up. FIG. 2 is a perspective view illustrating the image pickup apparatus of FIG. 1 as seen from the side of a subject. FIG. 3 is a side view illustrating the display cabinet 5 in a closed state as seen from the right side in FIG. 2 partly in section taken along a line C-C in FIG. 2. In the following description, the term "front side" is defined as the side of the subject, and the term "back side" is defined as the side of the photographer.

The main cabinet 1 is of an elongated flat shape having a hollow inside, and has a length of 90 to 100 mm, a width of about 35 to 40 mm, and a thickness of 10 to 12 mm.

The one end of the main cabinet 1 has an arcuate surface 14 having a diameter equivalent to the width of the main cabinet. A lens 2 is provided at the arc center of the arcuate surface 14. The cabinets 1 and 5 are pivotal about the optical axis of the lens (denoted by a reference character L in FIG. 3) within a plane generally perpendicular to the optical axis.

The other end portion of the main cabinet 1 serves as a handle portion 10 of the image pickup apparatus 8, so that a user holds the handle portion 10 for taking a picture. The handle portion 10 has image pickup system switches 4 and a recording medium insertion portion 13. A recording medium (not shown) capable of storing audio-visual data is inserted in the recording medium insertion portion 13.

The image pickup system switches 4 include a video image recording switch 41, a zoom switch 42 and a first still image shutter 43 provided on the back side of the handle portion 10, and a second still image shutter 44 located on the right side of the handle portion as seen in FIG. 1. For picking up a still image, either the first still image shutter 43 or the second still image shutter 44 is pressed.

The switches 41, 42, 43 on the back side of the handle portion 10 are located within the reach of a thumb of a hand holding the handle portion 10, and are uncovered with the display cabinet 5 when the display cabinet 5 is pivoted into a horizontal orientation. A microphone 12 is provided in the vicinity of the lens 2 on the main cabinet 1.

The display cabinet 5 has substantially the same contour as the main cabinet 1. The display cabinet 5 is of an elongated flat shape having a hollow inside, and has a thickness of 7 to 10 mm. The display cabinet 5 includes a proximal portion 51, and a free end portion 52 connected to the proximal portion 51 pivotally about a pivotal support shaft 53. The pivotal support shaft 53 is located at a generally widthwise middle portion of the proximal portion 51. The monitor 6 is provided on one side of the free end portion 52. The one end of the proximal portion 51 has an arcuate surface 22 having a diameter equivalent to the width of the proximal portion 51, and has a bottomed hole 50 formed at the arc center of the arcuate surface 22. A hollow cylindrical pivot shaft 11 of the main cabinet 1 is pivotally fitted in the bottomed hole 50. The cabinets 1 and 5 are connected to each other so that the display cabinet 5 is pivotal with respect to the main cabinet 1 about a pivot center axis which is aligned with the optical axis L of the lens 2.

Playback system switches 7 are provided on the back side of the proximal portion 51.

The playback system switches 7 include a playback/stop switch 71, a fast forward switch 72, a reverse switch 73 and a camera/playback switch 74. These switches 71, 72, 73, 74 are located radially around the pivot center axis of the display cabinet 5 within the reach of the thumb of the hand holding the handle portion 10. The playback system switches 7 are flush with the back surface of the proximal portion 51.

The monitor 6 comprises a liquid crystal display panel or an organic electroluminescent display panel, and has a rectangular shape elongated longitudinally of the display cabinet 5. A speaker 54 is provided at a distal end of the free end portion 52. Audio data stored in the recording medium is reproduced by the speaker 54.

As shown in FIG. 3, a cover plate 21 is slidably or pivotally provided in front of the lens 2 so as to cover and uncover the lens 2, and an image pickup device 3 is provided behind the lens 2. A part of the lens 2 and the image pickup device 3 are accommodated in the hollow cylindrical pivot shaft 11 projecting from the back surface of the main cabinet 1. The image pickup device 3 is a known device adapted to convert light received from the lens into electric signals.

Figure 4:
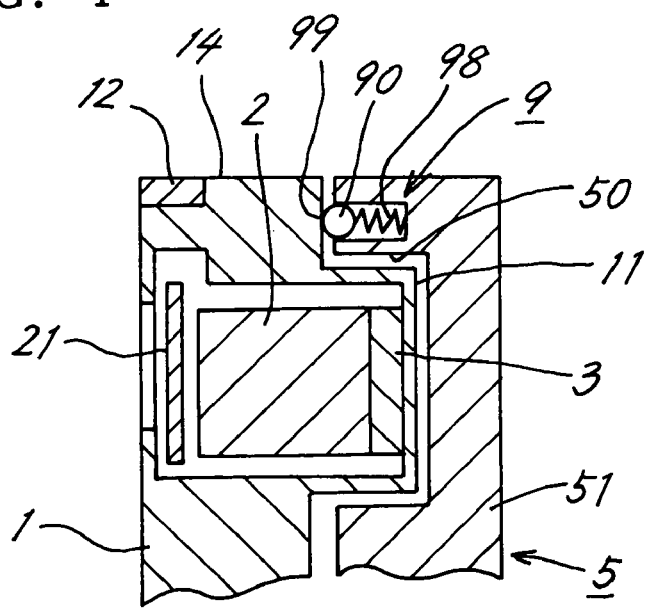
FIG. 4 is a side sectional view illustrating a soft lock device.

A soft lock device 9 is provided in opposed surfaces of the proximal portion 51 of the display cabinet 5 and the main cabinet 1 for softly locking the display cabinet 5 in a state where the cabinets 5 and 1 are overlapped with each other with their contours aligned with each other, or at a rightward or leftward perpendicularly pivoted position with respect to the main cabinet 1 which is supported vertically. The soft lock device 9 may be constructed in any of various ways. A conceivable construction of the soft lock device 9 is such that a ball 90 biased by a spring 98 as projecting from the proximal portion 51 is brought into and out of engagement with an engagement hole 99 provided in the main cabinet 1 as shown in FIG. 4. The engagement hole 99 is provided in association with a position at which the display cabinet 5 is fixed.

The soft lock device 9 is also provided in the opposed surfaces of the proximal portion 51 and the free end portion 52 of the display cabinet 5, and adapted to softly lock the free end portion 52 in a forwardly oriented state or in a rearwardly oriented state to which the free end portion 52 is pivoted by 180 degrees from the forwardly oriented state.

If the display cabinet 5 is pivoted rightward when an image is displayed in a correct vertical orientation on the monitor 6 with the display cabinet 5 located at the leftward pivoted position as shown in FIG. 1, the image is displayed upside down. For prevention of this phenomenon, the image pickup apparatus incorporates a known image inverting function for detecting the pressing of a known manual image inversion switch (not shown) or automatically detecting the orientation of the display cabinet 5 to invert the image.

Figure 5:
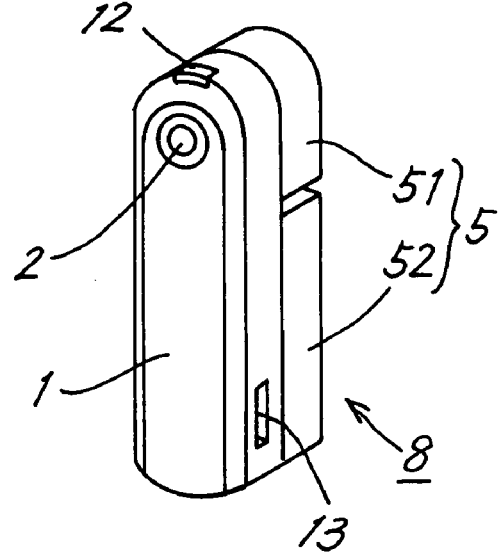
FIG. 5(a) is a perspective view illustrating the display cabinet in the closed state.
FIG. 5(b) is a perspective view illustrating the display cabinet in an open state as seen from the side of the subject.
FIG. 5(c) is a perspective view illustrating the display cabinet of FIG. 5(b) as seen from the side of a right-handed photographer.
Figure 5:
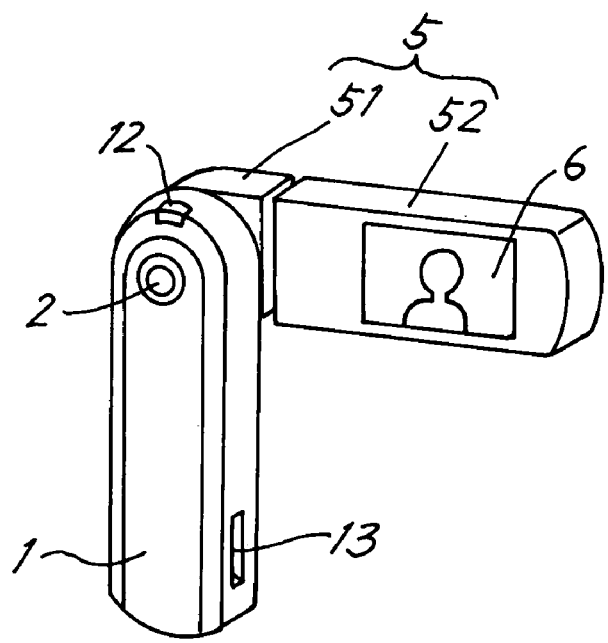
Figure 5:
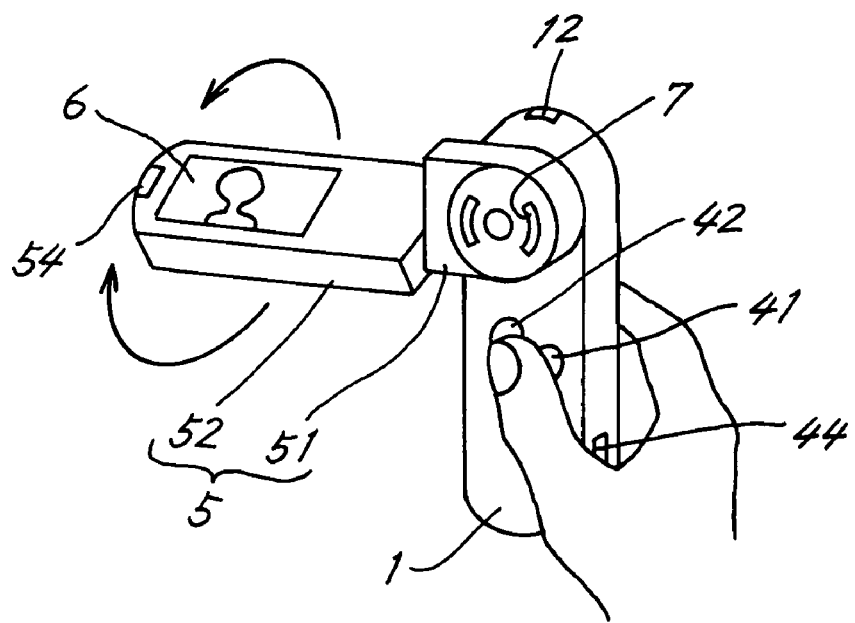

Folded and Unfolded States of Image Pickup Apparatus For Storage and Video Image Pickup The image pickup apparatus is folded with the display cabinet 5 being overlapped with the main cabinet 1 as shown in FIG. 5(a) when an image pickup operation is not performed. Therefore, the image pickup apparatus can conveniently be carried and stored. If the monitor 6 on the display cabinet 5 is opposed to the main cabinet 1 at this time, the monitor 6 can be protected by the main cabinet 1 which serves as a cover for the monitor 6.

When a video image is to be picked up, the display cabinet 5 is pivoted within the plane generally perpendicular to the optical axis of the lens thereby to be opened.

Where the photographer is right-handed, the display cabinet 5 is pivoted with respect to the vertically oriented main cabinet 1 rightward as seen from the side of the subject (FIG. 5(b)) and leftward as seen from the side of the photographer (FIG. 1). The display cabinet 5 is fixed at a 90-degree pivoted position with respect to the main cabinet 1 by the soft lock device 9. As shown in FIG. 5(c), the operation switches including the image pickup system switches 4 and the playback system switches 7 are located at positions accessible by the finger of the right hand holding the main cabinet 1 for operation thereof. That is, it is possible to hold the image pickup apparatus 8 and operate the switches by a single hand.

Where the photographer is left-handed, the display cabinet 5 is pivoted rightward as seen from the side of the photographer, and fixed at the pivoted position by the soft lock device 9 (FIG. 6(a)). Whether the photographer is right-handed or left-handed, the video image can be picked up by pressing the video image recording switch 41 by the finger of the hand holding the main cabinet 1.

When the video image is to be picked up, the display cabinet 5 is oriented in the same direction as the movement of the hand toward the main cabinet 1 for holding the main cabinet 1. That is, when the main cabinet 1 is to be held by the right hand, the right hand is moved leftward from the right side of the main cabinet 1 to hold the main cabinet 1. Since the display cabinet 5 is kept in the leftward pivoted state at this time, the display cabinet 5 does not hinder the right hand.

When the main cabinet 1 is to be held by the left hand, the display cabinet 5 is fixed in the rightward pivoted state and, hence, does not hinder the left hand. Therefore, the main cabinet 1 can naturally and easily be held.

The monitor 6 is located away from the hand holding the image pickup apparatus. Therefore, when the photographer stretches his arm forward with the image pickup apparatus 8 held by the hand and the free end portion 52 of the display cabinet 5 is pivoted about the pivotal support shaft 53, the monitor 6 is located just in front of the face of the photographer. Thus, the photographer can easily view the monitor 6 and take a picture.

The pivot center of the display cabinet 5 is located in the vicinity of the one end of the main cabinet 1. Therefore, when the display cabinet 5 is opened perpendicularly to the main cabinet 1, the main cabinet 1 serves as the handle portion 10. Thus, the image pickup apparatus can easily be held by the single hand.

In this embodiment, the playback system switches 7 are located around the pivot center of the display cabinet 5. Further, the display cabinet 5 is oriented away from the hand holding the main cabinet 1, so that the monitor 6 on the display cabinet 5 is not shaded by the finger of the hand operating the playback system switches 7.

Still Image Pickup

When a still image is to be picked up, the image pickup apparatus 8 is horizontally held with the second still image shutter 44 facing upward as shown in FIG. 6(b) by extending the display cabinet 5 straight in the same direction as the main cabinet 1.

When the still image shutter 44 is pressed, right and left ends of the image pickup apparatus 8 are held by both hands to suppress the shake of the apparatus. The pickup of a video image may also be achieved in the state shown in FIG. 6(b). However, if the main cabinet 1 has a greater length, there is a possibility that the video image recording switch 41 is out of the reach of the finger.

Depending on how the main cabinet 1 is held by the right hand, the first still image shutter 43 on the back side of the main cabinet 1 is accessible by the finger of the hand. Therefore, the second still image shutter 44 may be obviated.

Where the photographer is left-handed, the free end portion 52 is pivoted in a direction opposite from the aforesaid direction, and the image on the monitor 6 is inverted. This makes it possible to hold the main cabinet 1 by the left hand and operate the first still image shutter 43 by the finger of the left hand.

In the embodiment described above, the lens 2 is provided in the main cabinet 1, but may be provided in the display cabinet 5.

In the image pickup apparatus according to the first embodiment, the image pickup device 3 and the lens 2 are provided in the main cabinet 1 and, even if the display cabinet 5 is pivoted, the image pickup device 3 and the lens 2 are not pivoted.

Figure 6:
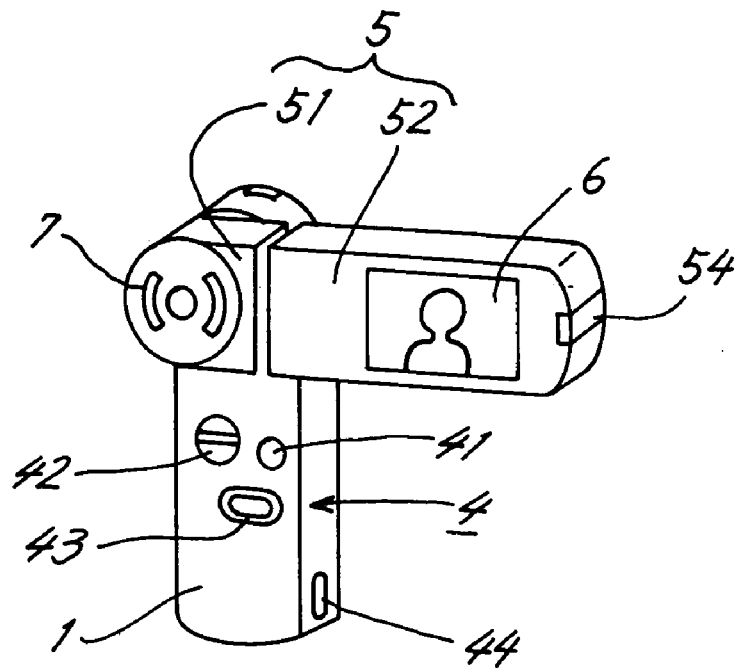
FIG. 6(a) is a perspective view illustrating the display cabinet in the open state as seen from the side of a left-handed photographer.
FIG. 6(b) is a perspective view illustrating the image pickup apparatus as seen from the side of the photographer when a still image is picked up.
Figure 6:
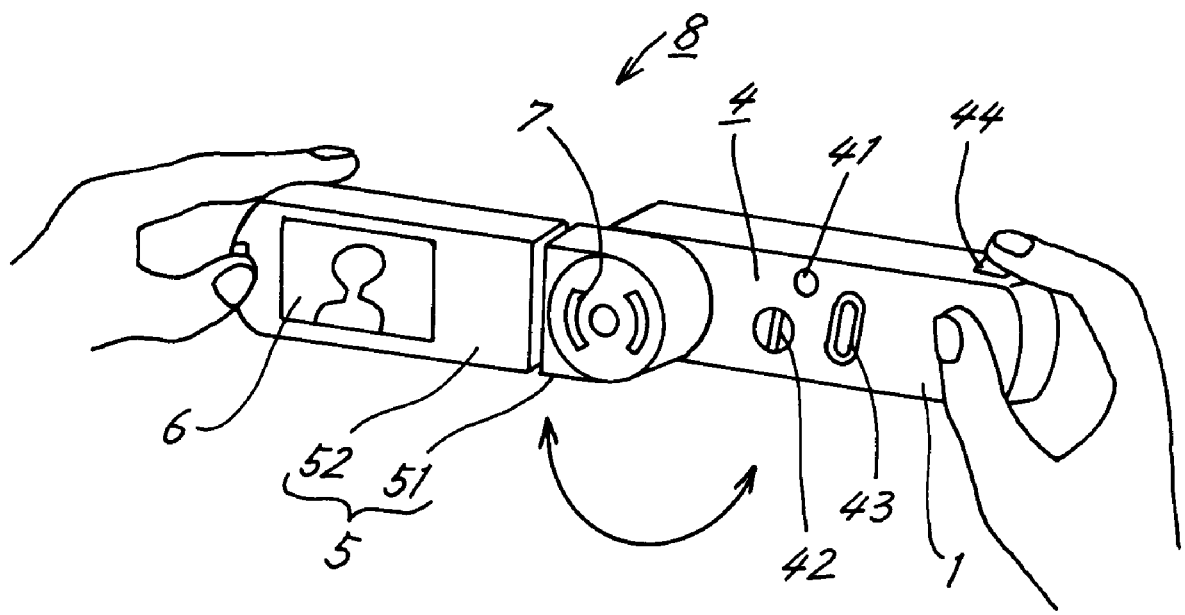
Figure 7:
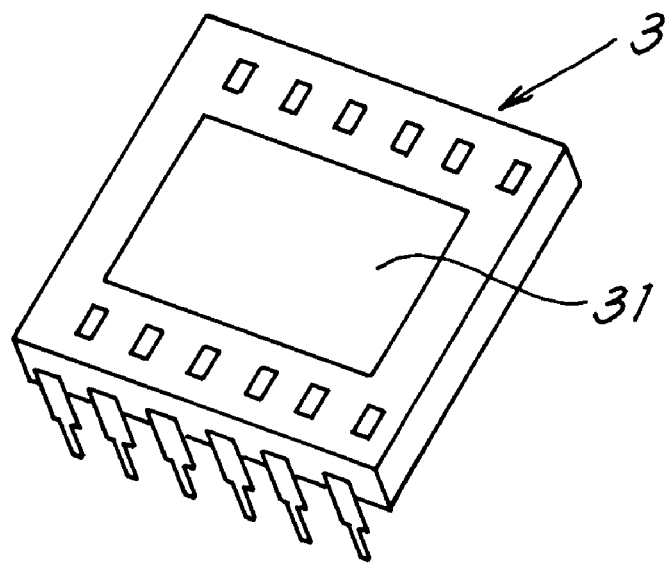
FIG. 7 is a perspective view of an image pickup device.
Figure 8:
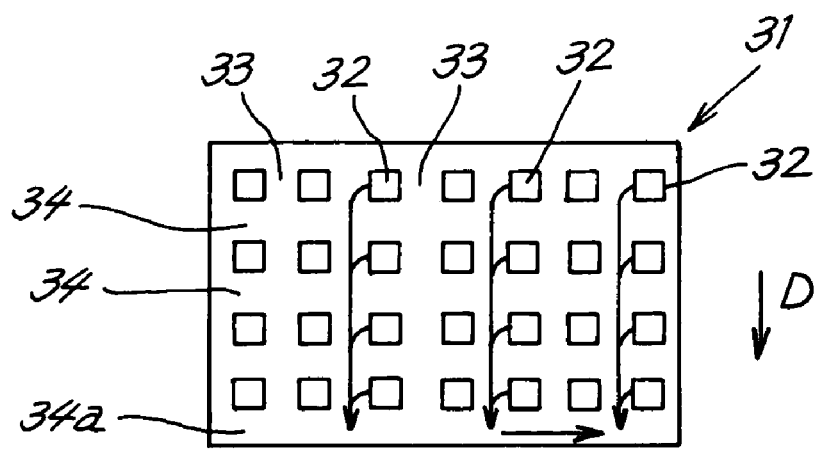
FIG. 8 is a plan view illustrating the internal construction of a light receiving surface.
Figure 9:
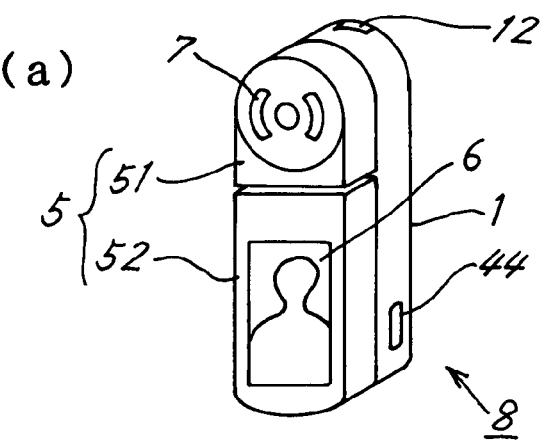
FIGS. 9(a), 9(b) and 9(c) are perspective views each illustrating a display state on a monitor.
Figure 9:
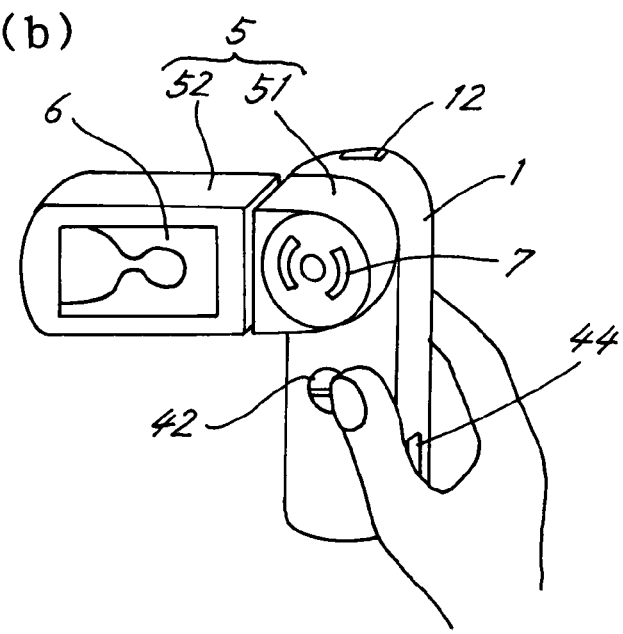
Figure 9:
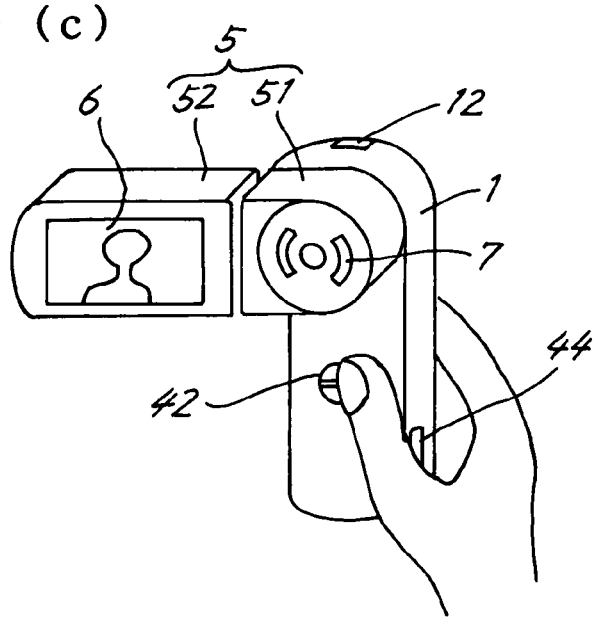

FIG. 7 is a perspective view of the image pickup device 3. The image pickup device 3 has a rectangular light receiving surface 31 which is longitudinally aligned with the main cabinet 1. A specific example of the image pickup device 3 is a CCD. FIG. 8 is a diagram illustrating the internal construction of the light receiving surface 31. A multiplicity of photodiodes 32, 32 for converting received light into electrical signals are arranged in a matrix pattern in the light receiving surface 31. The photodiodes 32, 32 are separated from each other by vertical trenches 33 and horizontal trenches 34. Electrons from the photodiodes 32, 32 flow downward (in an arrow direction D) through the vertical trenches 33 adjacent to the respective photodiodes 32, and are applied to an image processing circuit (not shown) through the lowermost horizontal trench 34 serving as a transfer portion 34a. The image processing circuit is connected to a light receiving surface orientation detecting circuit (not shown). If the light receiving surface 31 extends horizontally, the image processing circuit displays a horizontally elongated image on the monitor 6 by arranging pixel data.

Where the image pickup apparatus 8 is unfolded straight and oriented horizontally as shown in FIG. 6(*b*), the light receiving surface 31 is located in a horizontally elongated state. Thus, a horizontally elongated erect image is displayed on the monitor 6.

Where the image pickup apparatus 8 is folded and oriented vertically as shown in FIG. 9(*a*), the light receiving surface 31 is located in a vertically elongated state. The light receiving surface orientation detecting circuit applies information on the orientation of the light receiving surface to the image processing circuit. Then, the image processing circuit transforms the arrangement of pixel data by 90 degrees, and a vertically elongated erect image is displayed on the vertically oriented monitor 6.

When the display cabinet 5 is pivoted leftward by 90 degrees from the state shown in FIG. 9(*a*) to orient the monitor 6 horizontally as shown in FIG. 9(*b*), the image pickup device 3 on the main cabinet 1 is not pivoted, so that a sideward image is displayed on the horizontally oriented monitor 6.

It is not practical to pick up the image in the state shown in FIG. 9(*b*). Therefore, the orientation of the image is electrically changed, so that the erect image is displayed on the horizontally oriented monitor 6. In this case, however, the image cannot be displayed on the transversely full screen of the horizontally oriented monitor 6. Thus, the monitor 6 cannot efficiently be utilized.

Second Embodiment

To cope with this, the inventor of the present invention has come up with an idea of permitting the image pickup device 3 to pivot unitarily with the display cabinet 5. As the image pickup device 3, a CMOS may be provided instead of the CCD.

Figure 10:
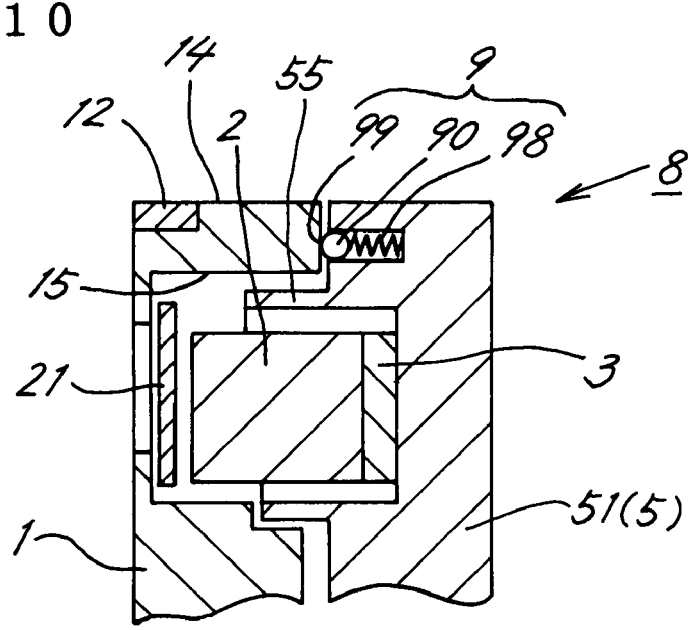
FIG. 10 is a side sectional view illustrating another image pickup apparatus.
Figure 11:
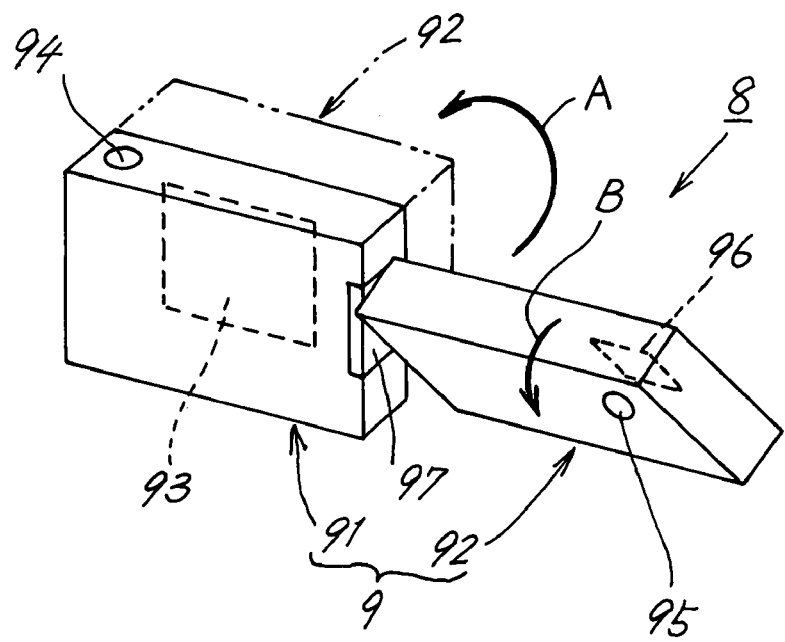
FIG. 11 is a perspective view illustrating a conventional image pickup apparatus as seen from the side of a subject.

FIG. 10 is a sectional view illustrating another image pickup apparatus 8 in which the image pickup device 3 and the lens 2 are pivotal unitarily with the display cabinet 5.

A hollow cylindrical pivot shaft 55 is provided in the one end portion of the display cabinet 5, and the lens 2 and the image pickup device 3 are accommodated in the hollow cylindrical pivot shaft 55. The hollow cylindrical pivot shaft 55 is pivotally fitted in a hole 15 formed in the one end portion of the main cabinet 1. The display cabinet 5 is softly locked at a pivot position by the soft lock device 9.

The lens 2 and the image pickup device 3 are pivotal unitarily with the display cabinet 5. Therefore, even if the display cabinet 5 is horizontally oriented and the main cabinet 1 is vertically oriented as shown in FIG. 9(*c*), the light receiving surface 31 is horizontally oriented. Thus, an erect image can be displayed on the transversely full screen of the horizontally oriented monitor 6.

Both the lens 2 and the image pickup device 3 are arranged pivotally, because the integration of the lens 2 and the image pickup device 3 is more convenient for assembling.

What is claimed is:

1. An electronic image pickup apparatus comprising:
   a main cabinet serving as a handle portion;
   a display cabinet having a monitor and attached to the main cabinet as overlapping with the main cabinet;
   a lens provided on one of the main cabinet and the display cabinet for picking up an image;
   the main cabinet and the display cabinet being pivotal within a plane generally perpendicular to an optical axis of the lens with one end of the main cabinet being connected to one end of the display cabinet; and
   a lock device provided between the main cabinet and the display cabinet for holding the display cabinet at a pivot position with respect to the main cabinet, wherein
   the optical axis of the lens is aligned with the pivot center axis of the display cabinet,
   an image pickup device is located behind the lens, and
   the image pickup device is supported so as to be pivotal unitarily with the display cabinet.

2. An electronic image pickup apparatus as set forth in claim 1, wherein an operation switch is provided on the main cabinet within reach of a finger of a hand holding the main cabinet.

3. An electronic image pickup apparatus as set forth in claim 1, wherein an operation switch is provided on a proximal portion of the display cabinet.

4. An electronic image pickup apparatus as set forth in claim 1, wherein a recording star button is provided on a longitudinal end portion of the main cabinet.

5. An electronic image pickup apparatus as set forth in claim 1, wherein the image pickup device has a light receiving surface longitudinally aligned with the monitor.

* * * * *